INVENTOR.
WARREN W. HASTINGS
REIDAR A. TOLLEFSEN
BY
ATTORNEY

Patented Feb. 5, 1952

2,584,446

UNITED STATES PATENT OFFICE 2,584,446

LIQUID LEVEL GAUGE

Warren W. Hastings and Reidar A. Tollefsen, Brighton, N. Y., assignors to Rochester Manufacturing Company, Rochester, N. Y., a corporation of New York Application July 1, 1948, Serial No. 36,465

3 Claims. (Cl. 73—317)

1

The present invention relates to gauges and particularly to liquid-level gauges. In a still more specific aspect, the invention relates to float-type liquid-level gauges.

In float-type gauges the float is usually secured to an arm which is pivotally mounted on a column or support that carries an indicating device at its top; and the float arm is geared to the indicating device so that change in position of the float, due to change in level of the liquid, is recorded by the indicator. For proper operation, the length of the column or support must be such as to position the pivot point of the float arm a predetermined distance above the bottom of the tank or other vessel on which the gauge is to be used. Usually this is such as to place the pivot point midway of the height of the tank. If the pivot point is not at the right height, the float position will not correspond to the graduations of the gauge and the gauge will not indicate accurately.

A great variety of sizes of tanks are employed in all fields where liquid level gauges are used. For instance, in the liquid fuel storage field alone there are several different sizes of tanks employed. Heretofore, a different length gauge, that is, a gauge with a different length supporting column, has had to be employed for each different size tank.

When liquid level gauges are used in tanks for liquified petroleum gases, such as butane and propane, not only does the tank size enter into the length of gauge required, but also the height of the riser or stand-pipe used on the tank. Tanks for these low specific gravity liquids are frequently buried in the ground for safety and a riser or stand-pipe has to be employed to position the indicating part of the gauge above ground level. The heights of the risers vary with different conditions.

Heretofore, then, it has been necessary to provide a great variety of different lengths of liquid-level gauges to meet different requirements as to tank size and riser heights. This means that a large inventory must be maintained; and it adds to the production costs.

A primary object of the present invention is to provide a liquid-level gauge which is more or less universal as regards length and which can readily be adapted for use in tanks of different heights and with risers of different heights.

Another object of the invention is to provide an adjustable length liquid-level gauge, which is so constructed that regardless of its adjusted length it will maintain its calibration and indicate accurately.

2

A further object of the invention is to provide an adjustable length liquid-level gauge which is simple and sturdy in construction.

Still another object of the invention is to provide a liquid-level gauge of the character described in which the geared connection between float and indicator will be adjusted correctly for length simultaneously with adjustment of the column for the correct length to suit a particular job.

Other objects of the invention will be apparent hereinafter from the specification and from the recital of the appended claims.

Figure 1:
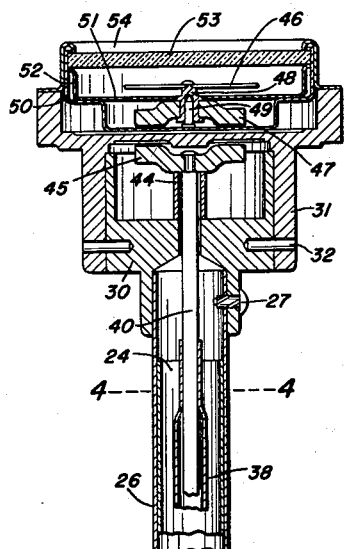
Fig. 1 is a vertical sectional view of a liquid-level gauge constructed according to one embodiment of this invention, and showing the gauge in zero position of its adjustment.

Referring now to the drawing by numerals of reference, 10 denotes the float arm of the gauge. This carries a float 11 at one end and a counterweight or balance 12 at its opposite end. The arm is secured by means of a clip 13 to a plate 14. The plate 14 has ears bent up from it at opposite sides as denoted at 15 and 16. The ear 16 is very much larger than ear 15 and is formed on its periphery with gear teeth 17 so that it constitutes a gear member.

Figure 3:
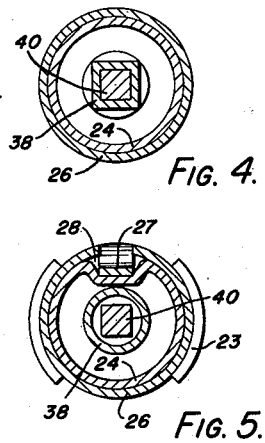
Fig. 3 is a fragmentary vertical sectional view taken at right angles to the section of Fig. 1 and showing the gauge adjusted for length from the position shown in Fig. 1.
Figure 5:
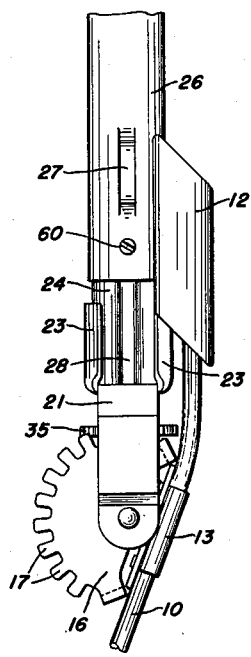
Fig. 5 is a transverse section on the line 5—5 of Fig. 1, again on an enlarged scale.
Figure 6:
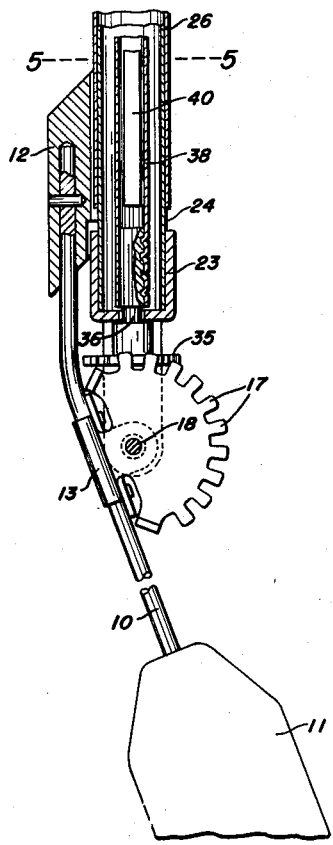
Fig. 6 is a fragmentary side elevation taken from the right in Fig. 3 but showing the gauge in approximately zero position of its length adjustment.

The plate 14 is journaled by means of ears 15 and 16 on a stud 18 which is secured against rotation in the furcations 20 of a yoke 21. The yoke has two diametrically opposed tongues 23 bent up from it that are welded or otherwise secured to the inner lower part 24 of a supporting post or column which comprises inner member 24 and outer member 26. Both members are tubular and part 24 slides and telescopes into part 26. The two parts are held against rotation relative to one another by a tongue 27 (Figs. 3, 5 and 6), which is formed on tube 26 and which engages in a slot or groove 28 that is formed longitudinally in the periphery of tube 24. Tongue 27 is formed by making two parallel slits in tube 26 and bending down the material between the slits. Tongue 27 acts not only to prevent rotation of tube 24 relative to tube 26 but as a guide during adjustment of these tubes relative to one another.

Tubular part 26 is fastened by pins 27 to a cup-shaped member 30. This is mounted within a recess of the gauge housing 31 to which it is secured by pins 32.

The gear member 16 meshes with a spur pinion 35 that is fastened to a shaft 36. This shaft may be made from a piece of bar-stock. It is of reduced diameter at its lower end and is journaled in the stud or bar 18 coaxial with tubes 24 and 26. It extends upwardly through a hole in the yoke 21 and is somewhat enlarged in diameter above the yoke. The collar portion of the yoke lies therefore between the enlarged portion of shaft 36 and the hub 37 of pinion 35.

Figure 4:
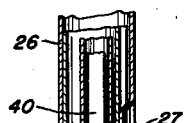
Fig. 4 is a transverse section on the line 4—4 of Fig. 1 but on an enlarged scale.

The shaft 36 is mounted coaxially within a tube 38 and is rigidly connected to the tube as, for instance, by punching the tube at several points into the shaft as shown clearly in Fig. 1. Mounted coaxially within tube 38 to telescope therein is a shaft 40. This shaft is square in cross-section as clearly shown in Figs. 4 and 5; and the tube 38 is formed at its upper end, as shown in Figs. 1 and 4, so that it is also square in cross-section to fit closely shaft 40. Thus rotation of tubular member 38 is imparted to shaft 40.

The shaft 40 is adapted to transmit the motion of pinion 35 to the indicating part of the gauge. The connection between shaft 40 and the indicator forms no part of the present invention. The gauge shown is of the magnetic type and here the connection between shaft 40 and the indicator is effected by operation of magnetic forces. The shaft 40 has a magnet 45 secured to it at its upper end; and the indicator needle or pointer 46 is mounted to rotate with a magnet 47. Both magnet 47 and needle 46 are secured to a bushing 48 that is journaled on a stud 49 in a casing 50. The two magnets 45 and 47 are permanent magnets and when magnet 45 rotates in one direction or the other under actuation of float 11, gearing 16—35, shaft 36, tubular member 38 and shaft 40, the magnet 47 will follow it, imparting rotation in one direction or the other to pointer 46. A spacer 44 surrounds the upper end of shaft 40 to locate magnet 45 in operative relation to magnet 47.

Figure 2:
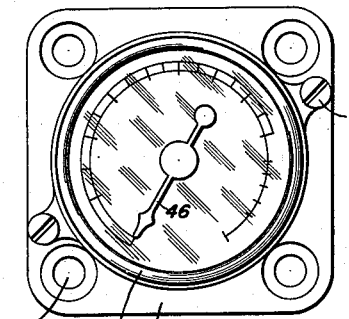
Fig. 2 is a plan view of the indicating part of this gauge.

The casing 50 is mounted in a recess formed in the top of housing 31. It contains a dial 51 and a ring-shaped member 52 which serves as a rest for the sight-glass 53. The dial 51 is suitably graduated on its face, as shown in Fig. 2, so that pointer 46 can indicate the level of liquid in the tank with which the gauge is used. Glass 53 is held in position on member 52 within casing 50 by a bezel 54, which is secured to housing 31 by screws 55. These pass through holes in ears, that are formed at diametrically opposite points on the bezel, and they thread into the upper face of the housing.

The gauge may be mounted on the tank or on the riser of the tank, on which it is to be used, by bolts (not shown) which pass through holes 56 in the housing and thread into the tank or riser. Shaft 40, member 30, housing 31, casing 50, etc. are made of non-magnetic material so as not to interfere with the action of magnets 45 and 47.

The gauge described can be used on tanks of different sizes and with different heights of risers. When the length of post or column, which is required to bring the pivot point of float arm 10 at the center of the height of the tank, is known, the correct length of gauge can be obtained by pulling out or pushing in tubular member 24 until the desired length is attained. The yoke 21 by its engagement with the hub 37 of pinion 35 or with the enlarged part of shaft 36 and the adjacent end of tube 38 causes the telescoping driven shaft 36—38—40 to lengthen or shorten correspondingly. Thus, by a single adjustment of the column or post, lengthwise adjustment of the driven shaft is effected simultaneously. The tongue 27 prevents tube 24 from turning during this lengthwise adjustment, a thing very essential to the accuracy of the readings of the gauge. If part 24 were to turn during lengthwise adjustment, the graduated indicating dial would be displaced angularly with reference to gearing 35—16 and float-arm 10 with the result that the gauge would not record properly the position of the float. One of the great features of the gauge of invention is that once the gauge is accurately calibrated it remains accurately calibrated regardless of its length.

The square shaft 40 and the squared end of tube 38 solve in simple fashion the problem of maintaining the drive in any adjusted position of the driven shaft. Once the adjustment for length has been made, the gauge operates just like a conventional gauge. Change of level of liquid in the tank causes movement of float arm 10 which is communicated through gearing 16—35, shaft 36, tube 38, shaft 40 and magnets 45 and 47 to needle 46.

A gauge made according to the present invention can be used, then, as long as a float rod 10 of suitable length is provided, on tanks of various sizes and having various heights of risers. A float rod 10 of proper length can readily be secured to the gauge by clip 13 by bending over the ears of the clip after they have been inserted in slot 19 of plate 14. The clip 13 is brazed, soldered or otherwise securely fastened to the arm 10.

The present invention provides therefore, an indexing type gauge of simple, compact structure which can be made up in quantity and adjusted at the factory or in the field to obtain the required length. A great saving in production costs results therefore, for all the liquid-level gauges for a particular type of work can be made alike regardless of tank or riser dimensions. If the length required is known in the factory, tube 24 can be adjusted to the required length and tongue 27 can then be spot-welded to tube 24 in the factory fixing the length of the gauge. If the length is not known in the factory, the length of the gauge can be adjusted in the field by jobber or user. A set-screw 60 is provided for this purpose to permit securing the tube 24 in any adjusted position. This set-screw threads into tube 26 and abuts against tube 24.

The invention obviously is not restricted to use with a magnetic type gauge, but may be employed on liquid-level gauges of various types. While a specific embodiment of the invention has been described, it will be understood, then, that the invention is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A liquid level gauge comprising a telescoping tubular column, a float arm pivotally mounted on one part of said column, a graduated dial carried by another part of the column, a pointer movably mounted on said other part of the column and adapted to register with said dial, a telescoping shaft rotatably mounted in the two parts of column, said shaft comprising two parts one of which is polygonal in cross section and the other of which is tubular but shaped to receive and to fit closely about the first, whereby one part of said shaft will rotate on rotation of the other part of said shaft, one part of said shaft being connected to said float arm to rotate on movement of the float arm and the other part of said shaft being connected to said pointer to move the same on rotation of the shaft, means connecting one part of said shaft to one section of the column so that the two move axially together, whereby the shaft adjusts telescopingly on telescoping adjustment of the column, and cooperating means on the two parts of the column for preventing rotation of one part of the column relative to the other during said adjustment.

2. In a liquid level gauge, a column comprising two tubular parts one of which telescopes into the other, a float arm pivotally mounted on one part of said column, a graduated dial carried by another part of the column, a pointer movably mounted on said other part of the column and adapted to register with said dial, a telescoping shaft rotatably mounted in the two parts of the column, said shaft comprising two parts one of which is polygonal in cross section and the other of which is tubular but of corresponding polygonal cross-section to receive and closely fit the first, so that rotation of one part of said shaft is transmitted to the other part thereof, one part of the shaft being connected to said float arm to rotate on movement of the float arm and the other part of said shaft being connected to said pointer to move the same on rotation of the shaft, means connecting one part of the shaft to one part of the column so that the two move axially together, whereby the shaft adjusts telescopingly on telescoping adjustment of the column, one part of the column being grooved longitudinally, and a tongue carried by the other part of the column and engaging in said groove to prevent rotation of the two parts of the column relative to one another during axial adjustment thereof.

3. A liquid level gauge comprising a telescoping tubular column, a member, which is movable in response to variations in level of liquid in a vessel, movably mounted on one part of said column, an indicator carried by another part of said column, and means for actuating said indicator on movement of said member comprising a telescoping shaft disposed within said tubular column coaxially therewith with its two end portions rotatably mounted in the said two parts of said column, one end part of said shaft being operatively connected to said member to be rotated on movement of said member, the other end part of said shaft being connected to said indicator to actuate said indicator on rotation of the first-named part of the shaft, means preventing rotation of one end part of said shaft relative to the other, means for connecting the first-named part of the shaft to the first-named part of the column so that on telescoping adjustment of the column the shaft is adjusted telescopically, and means preventing rotation of one part of said tubular column relative to the other.

WARREN W. HASTINGS.
REIDAR A. TOLLEFSEN.

REFERENCES CITED

The following references are of record in the file of this patent:

UNITED STATES PATENTS

| Number | Name | Date |
| --- | --- | --- |
| 1,072,122 | Johnston | Sept. 2, 1913 |
| 1,396,655 | Newton | Nov. 8, 1921 |
| 1,634,165 | Williams | June 28, 1927 |
| 1,920,971 | De Giers | Aug. 8, 1933 |
| 1,922,362 | Halversen | Aug. 15, 1933 |
| 1,971,610 | Hayward | Aug. 28, 1934 |

FOREIGN PATENTS

| Number | Country | Date |
| --- | --- | --- |
| 9,754 | Switzerland | Jan. 8, 1895 |
| 465,798 | France | Feb. 14, 1914 |